United States Patent
Linde et al.

(10) Patent No.: US 10,455,766 B2
(45) Date of Patent: Oct. 29, 2019

(54) SLATS FOR USE WITHIN A MATERIAL MOVING SYSTEM OF AN AGRICULTURAL COMBINE

(71) Applicant: CNH Industrial America, LLC, New Holland, PA (US)

(72) Inventors: Cooper W. Linde, Lancaster, PA (US); Cale N. Boriack, Lititz, PA (US); Jason R. Coppinger, Davenport, IA (US); Craig E. Murray, Davenport, IA (US); Kevin I. Koos, Iowa City, IA (US); William L. Cooksey, Geneseo, IL (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 55 days.

(21) Appl. No.: 15/381,327

(22) Filed: Dec. 16, 2016

(65) Prior Publication Data

US 2018/0168099 A1 Jun. 21, 2018

(51) Int. Cl.
| | |
|---|---|
| *A01D 61/00* | (2006.01) |
| *B65G 15/52* | (2006.01) |
| *A01D 41/10* | (2006.01) |
| *A01D 41/14* | (2006.01) |

(Continued)

(52) U.S. Cl.
CPC .......... *A01D 61/008* (2013.01); *A01D 41/10* (2013.01); *A01D 41/14* (2013.01); *A01D 61/04* (2013.01); *B65G 15/52* (2013.01); *B65G 19/22* (2013.01)

(58) Field of Classification Search
CPC ........ A01D 41/10; A01D 41/14; A01D 41/00; A01D 41/06; A01D 61/008; A01D 61/04;

(Continued)

(56) References Cited

U.S. PATENT DOCUMENTS

| | | | |
|---|---|---|---|
| 2,195,796 A | 4/1940 | Currie | |
| 2,571,955 A * | 10/1951 | Shields | B65H 5/028 198/731 |

(Continued)

FOREIGN PATENT DOCUMENTS

| | | |
|---|---|---|
| CN | 204642925 | 9/2015 |
| JP | S6194913 A | 5/1986 |

OTHER PUBLICATIONS

European Search Report for European Application No. 17207410.6, dated May 28, 2018 (7 pages).

*Primary Examiner* — Alicia Torres

(74) *Attorney, Agent, or Firm* — Peter K. Zacharias; Patrick M. Sheldrake

(57) ABSTRACT

A slat for use within a material moving system of an agricultural combine may include a connector web extending in a lengthwise direction of the slat between a first end and a second end and in a widthwise direction of the slat between a front side and a rear side of the slat. The connector web may also define an outer surface and an inner surface. The slat may also include a front wall extending outwardly from the outer surface of the connector web along the front side of the slat and a rear wall extending outwardly from the outer surface of the connector web along the rear side of the slat. Additionally, the slat may include one or more additional features for increasing the structural integrity of the slat and/or for enhancing the crop grabbing/gripping capabilities of the slat.

17 Claims, 17 Drawing Sheets

(51) Int. Cl.
*A01D 61/04* (2006.01)
*B65G 19/22* (2006.01)

(58) Field of Classification Search
CPC . B60P 1/36; B60P 1/365; B65G 19/22; B65G 19/10; B65G 17/063; B65G 17/067; B65G 15/52
USPC ............... 460/114; 198/804, 734, 728, 729; 56/14.5
See application file for complete search history.

(56) References Cited

U.S. PATENT DOCUMENTS

| | | | | |
|---|---|---|---|---|
| 2,754,957 | A | * | 7/1956 | Dodson ............... B65G 19/08 198/731 |
| 3,715,025 | A | * | 2/1973 | Temme ............... B65G 19/22 198/727 |
| 3,967,719 | A | | 7/1976 | Kloefkorn et al. |
| D258,500 | S | * | 3/1981 | Kloefkorn ............... D34/29 |
| 5,346,429 | A | | 9/1994 | Farley |
| 5,478,277 | A | | 12/1995 | Kloefkorn |
| 7,260,967 | B2 | | 8/2007 | Gryspeerdt |
| D553,824 | S | * | 10/2007 | Rijksen ............... D34/29 |
| 7,473,168 | B2 | * | 1/2009 | Day ............... A01D 61/04 460/16 |
| 8,701,870 | B1 | * | 4/2014 | Farley ............... B60P 1/36 198/727 |
| 2004/0250523 | A1 | | 12/2004 | Schulz |
| 2007/0170042 | A1 | | 7/2007 | Foster et al. |
| 2013/0313077 | A1 | * | 11/2013 | Boyd ............... A01D 61/008 198/617 |

* cited by examiner

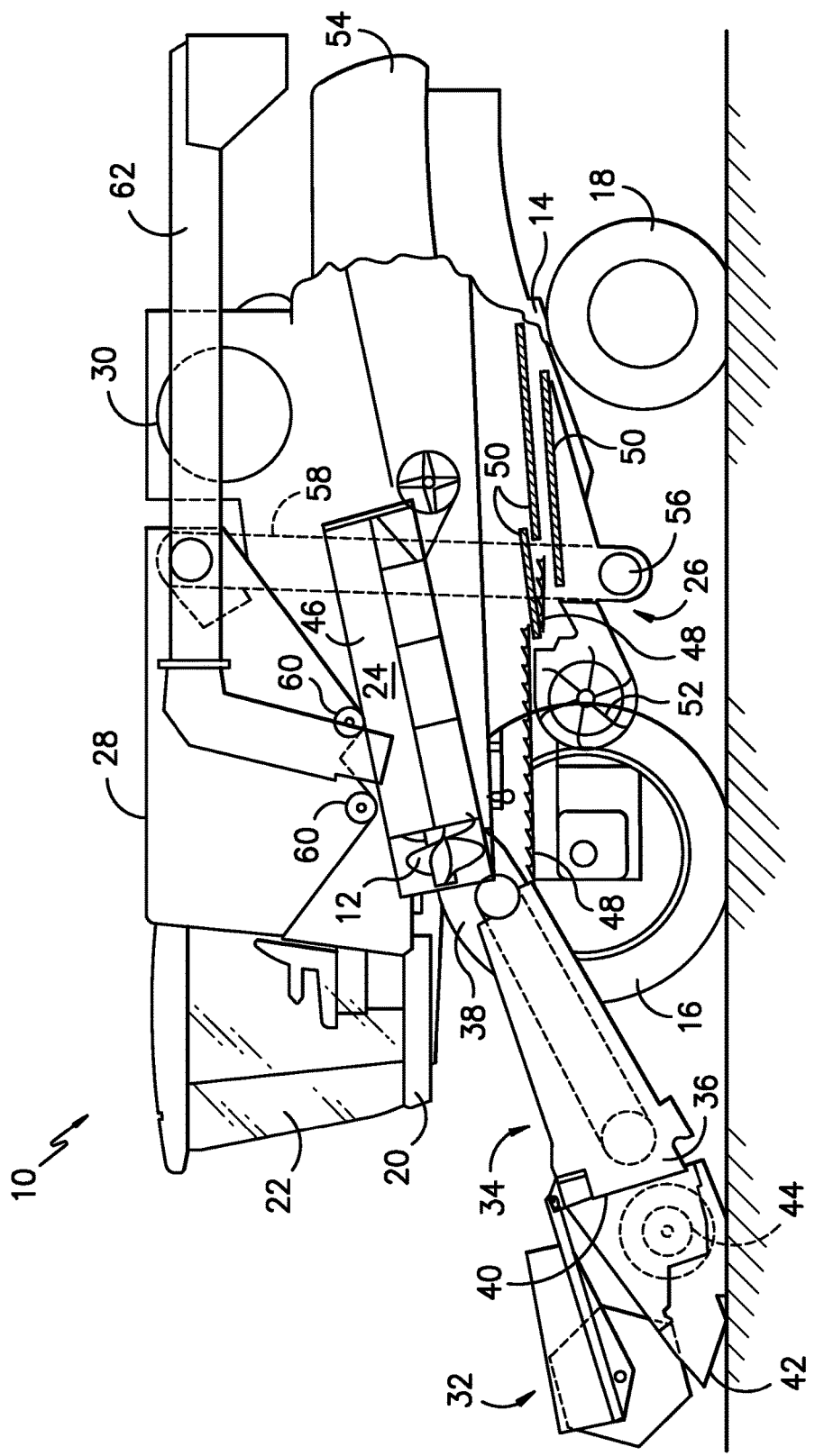
FIG. -1-

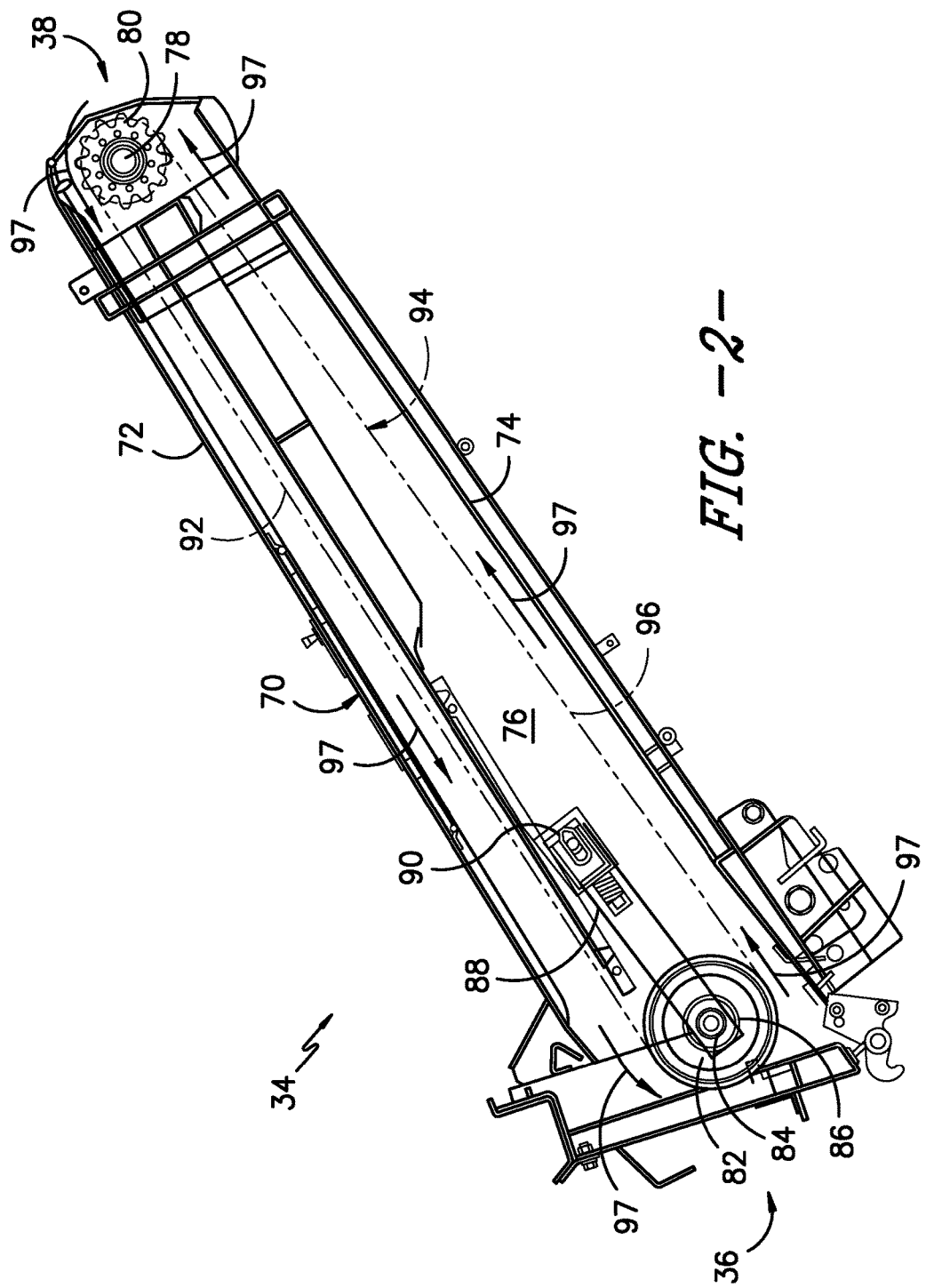

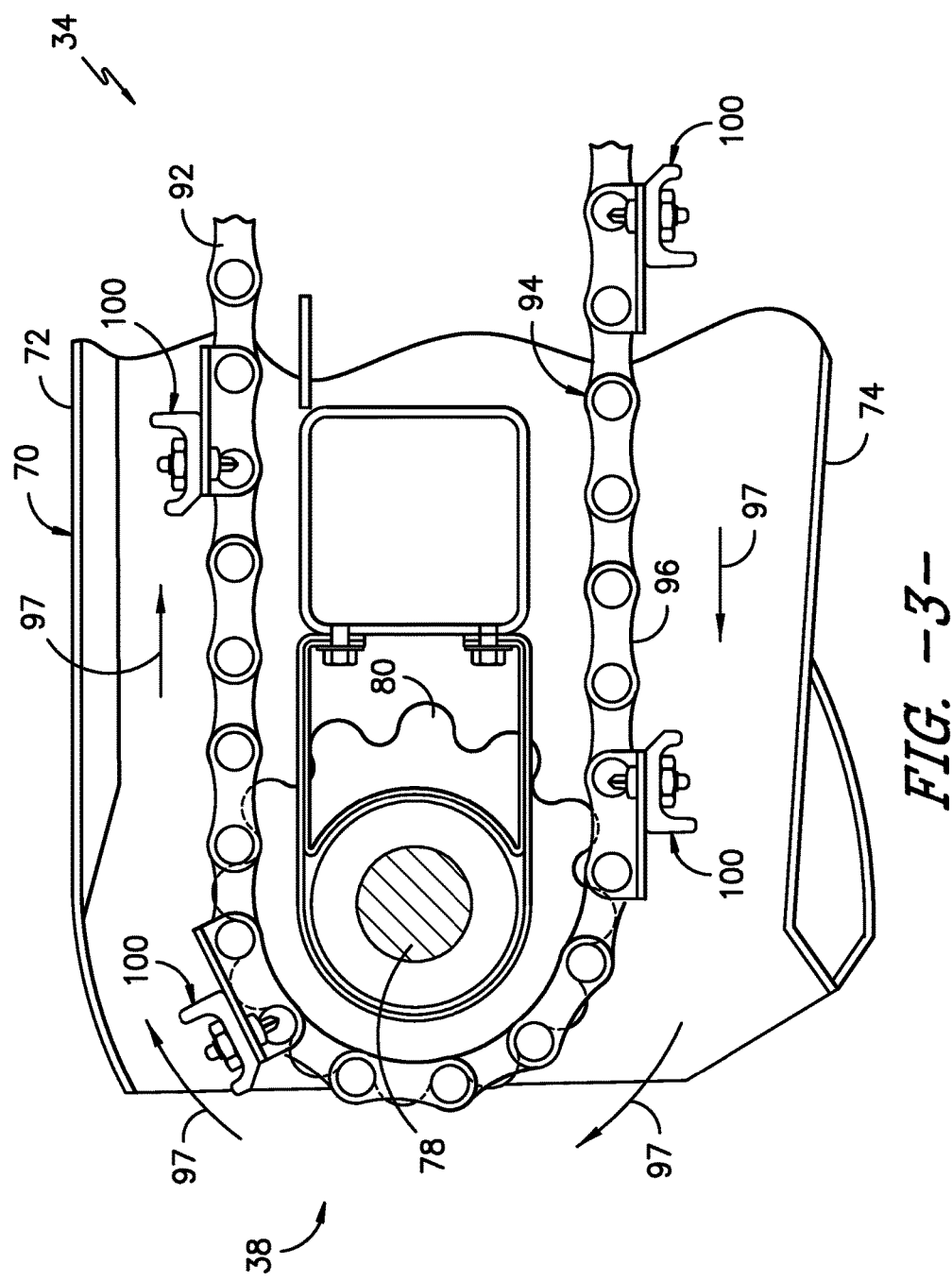
FIG. -3-

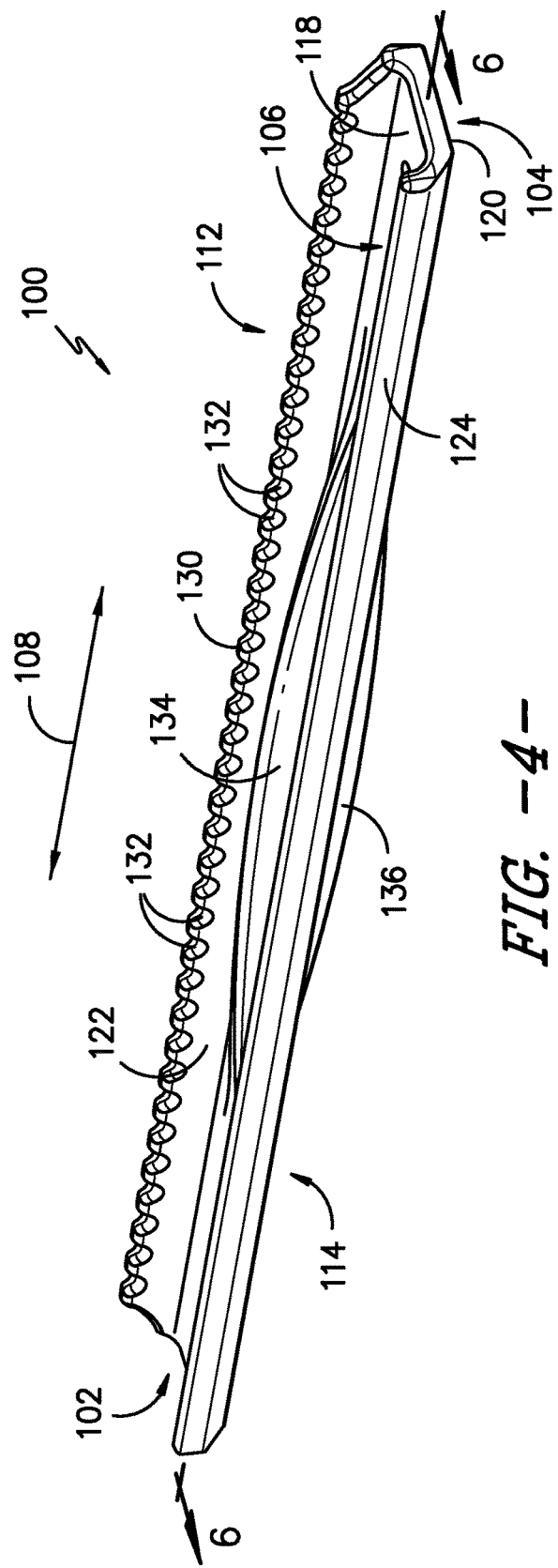
FIG. -4-

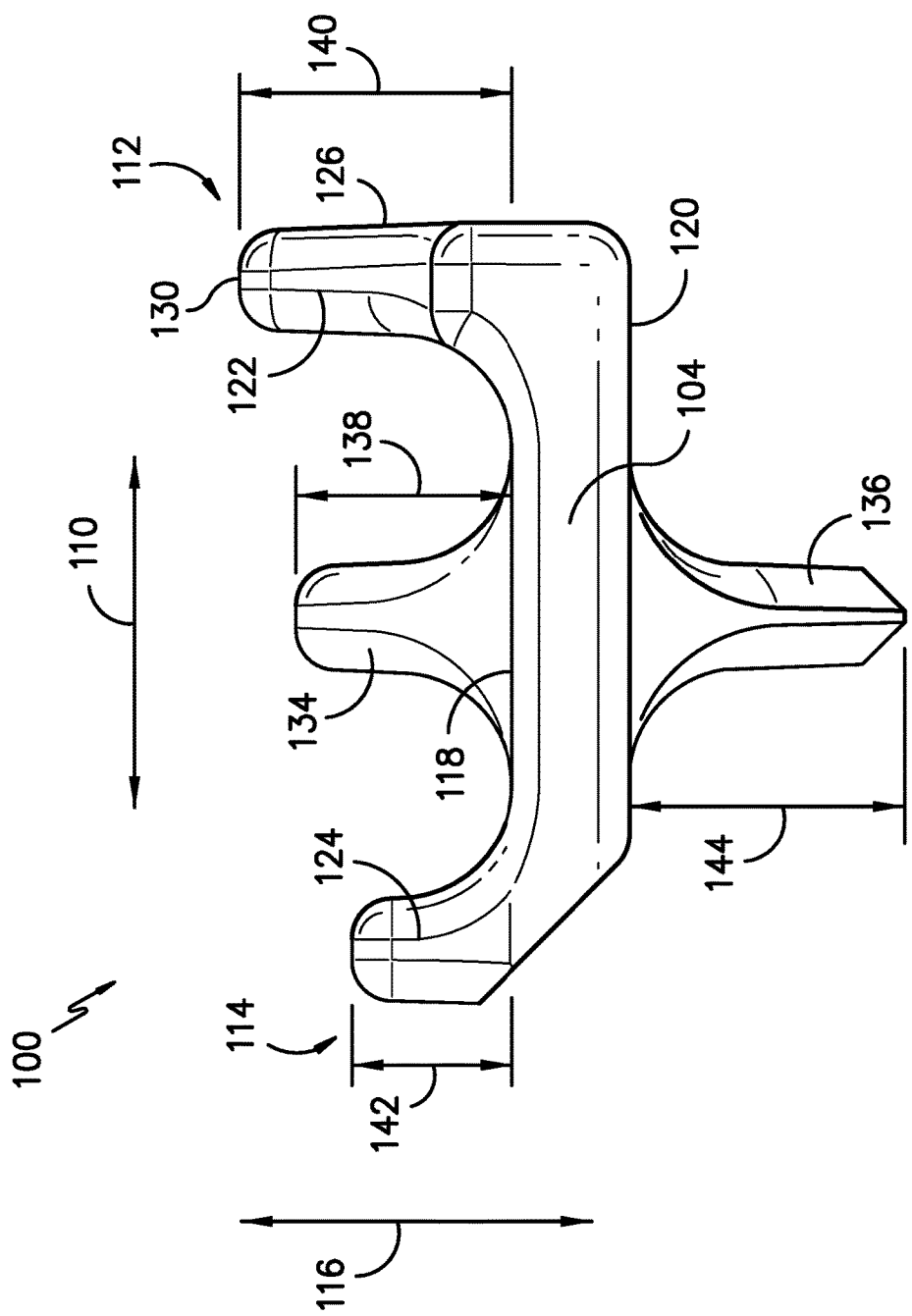
FIG. -5-

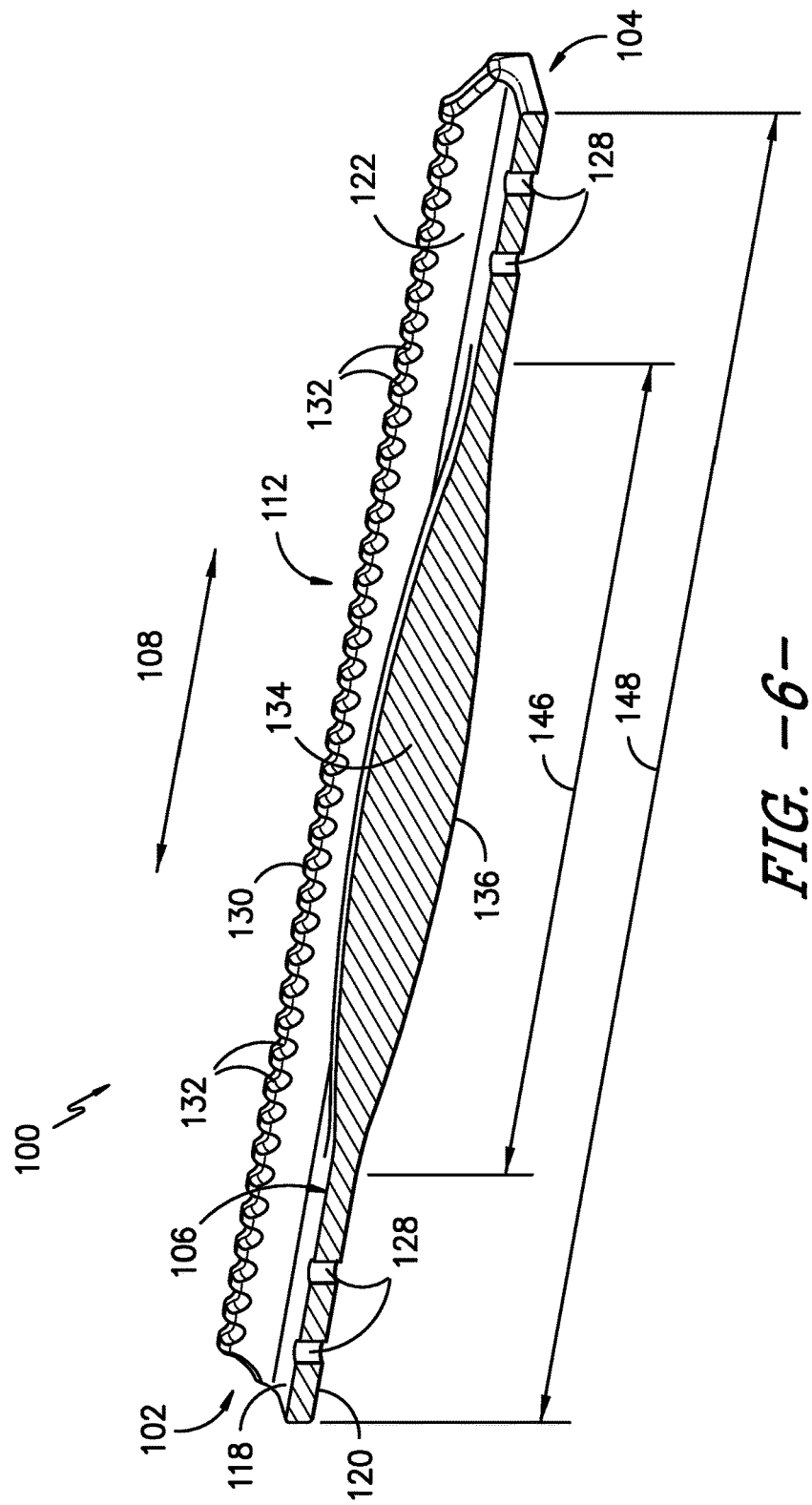

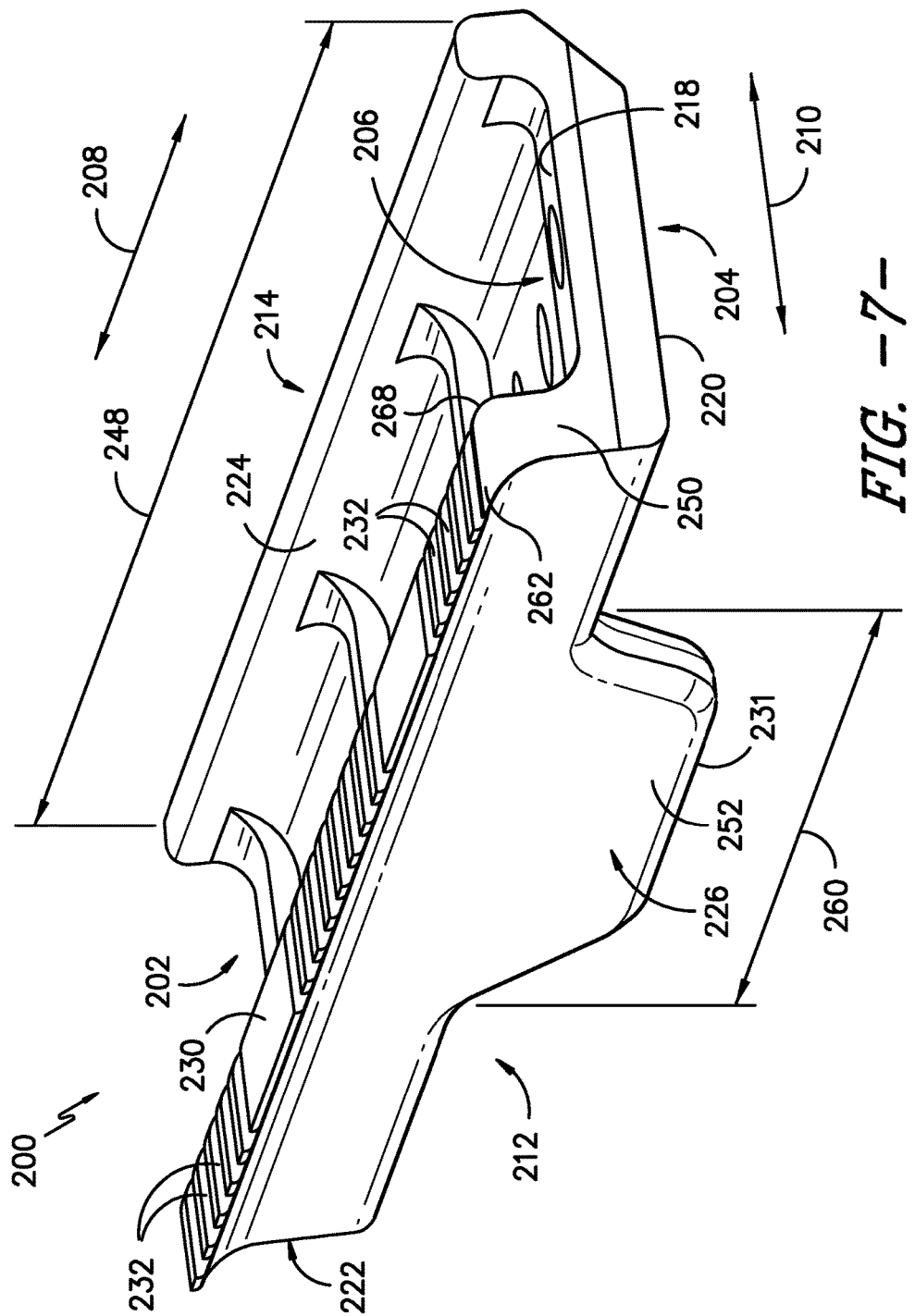

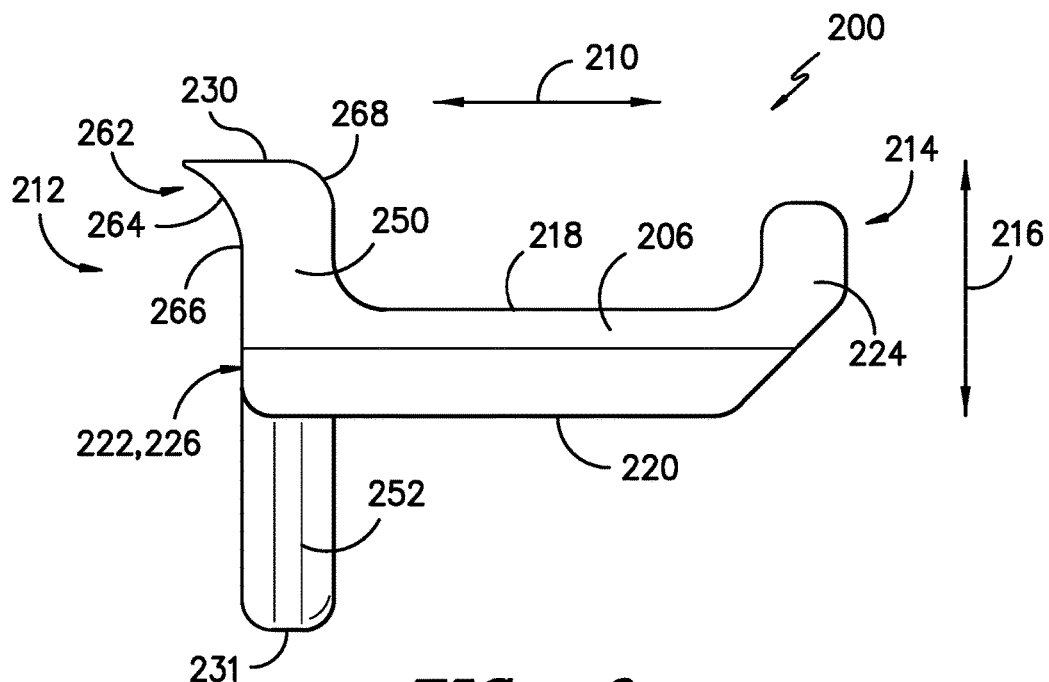
FIG. -8-
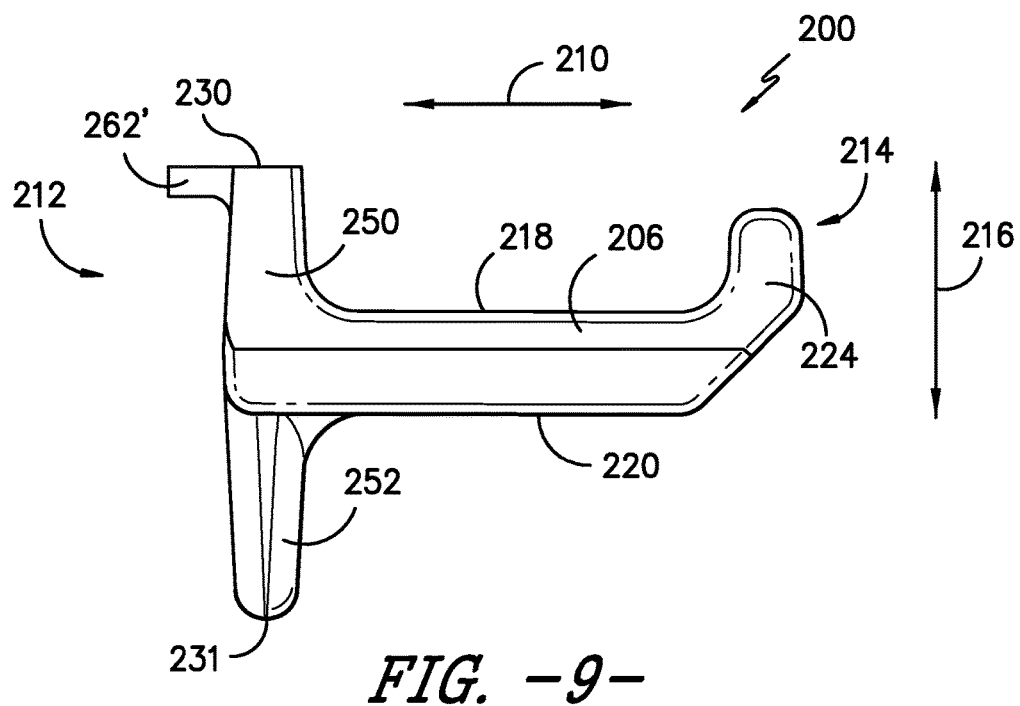
FIG. -9-

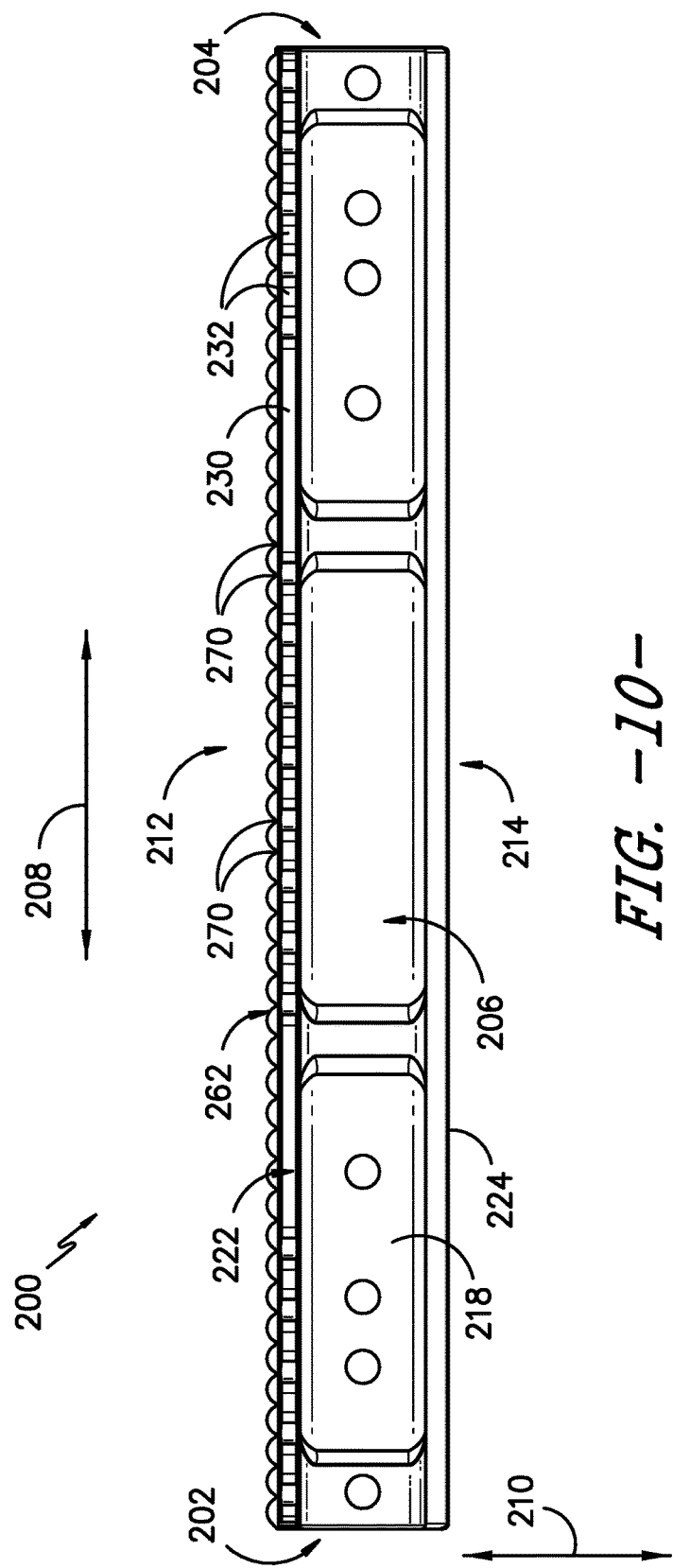
FIG. -10-

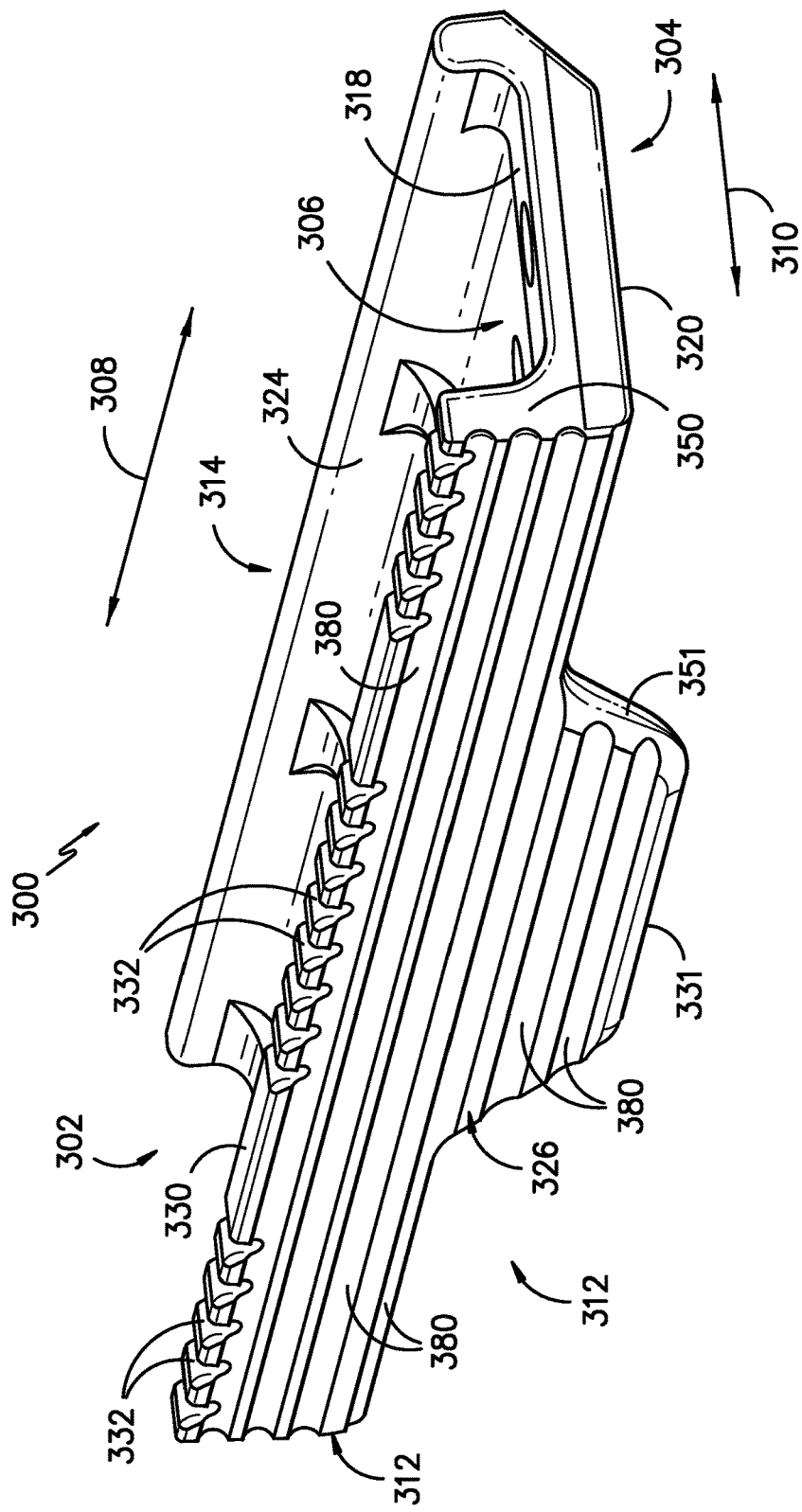
FIG. -11-

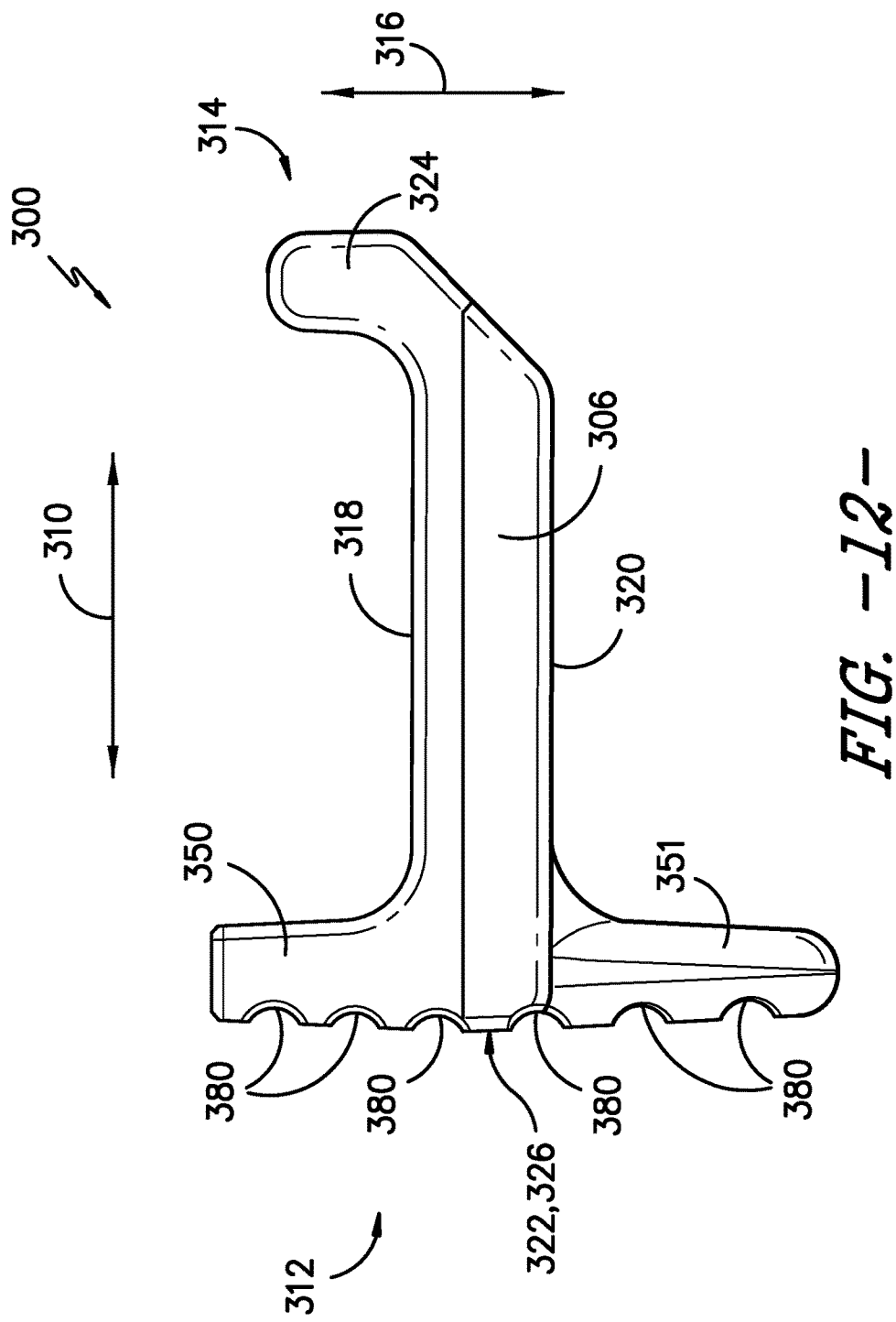

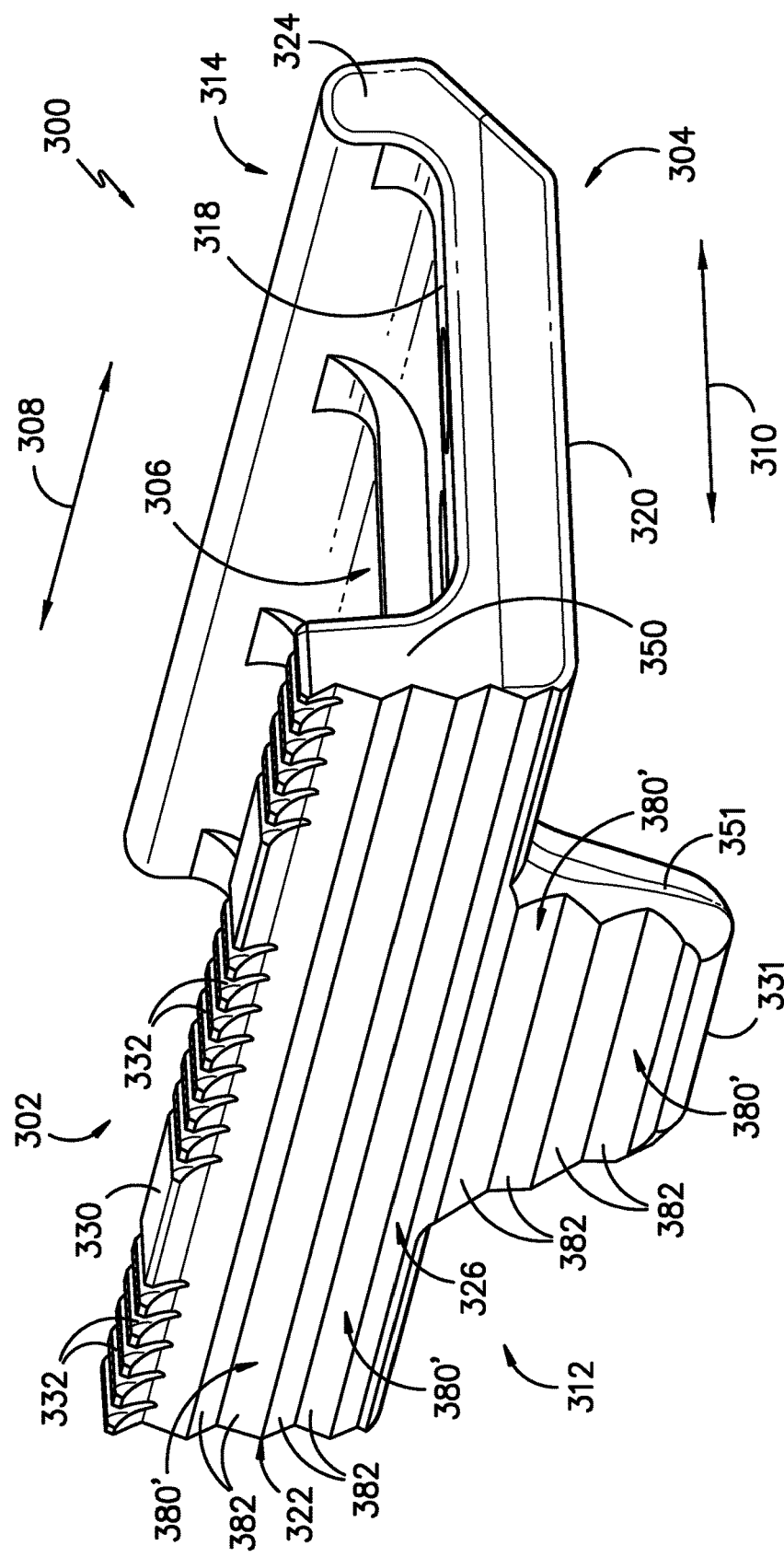
FIG. -13-

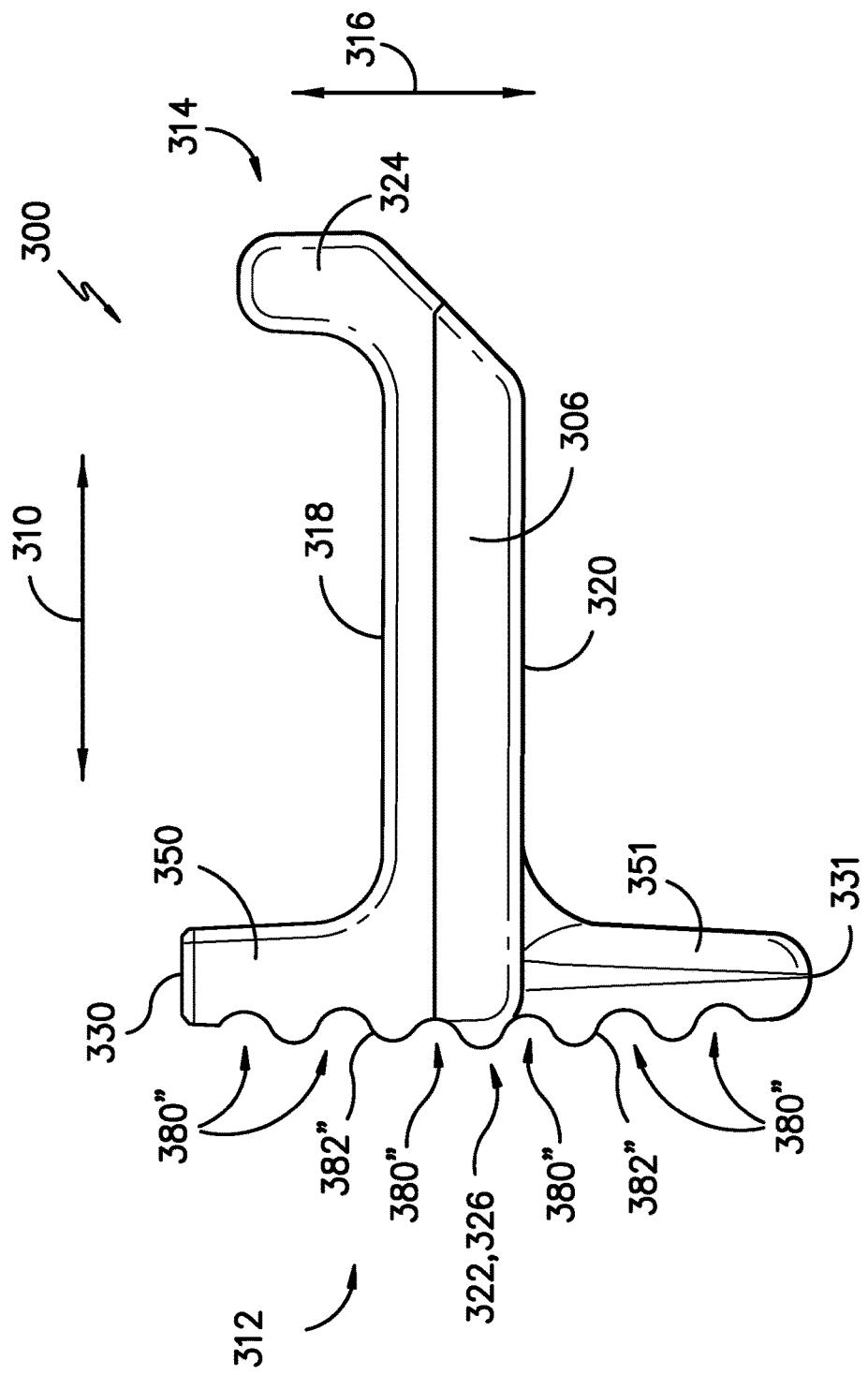
FIG. -14-

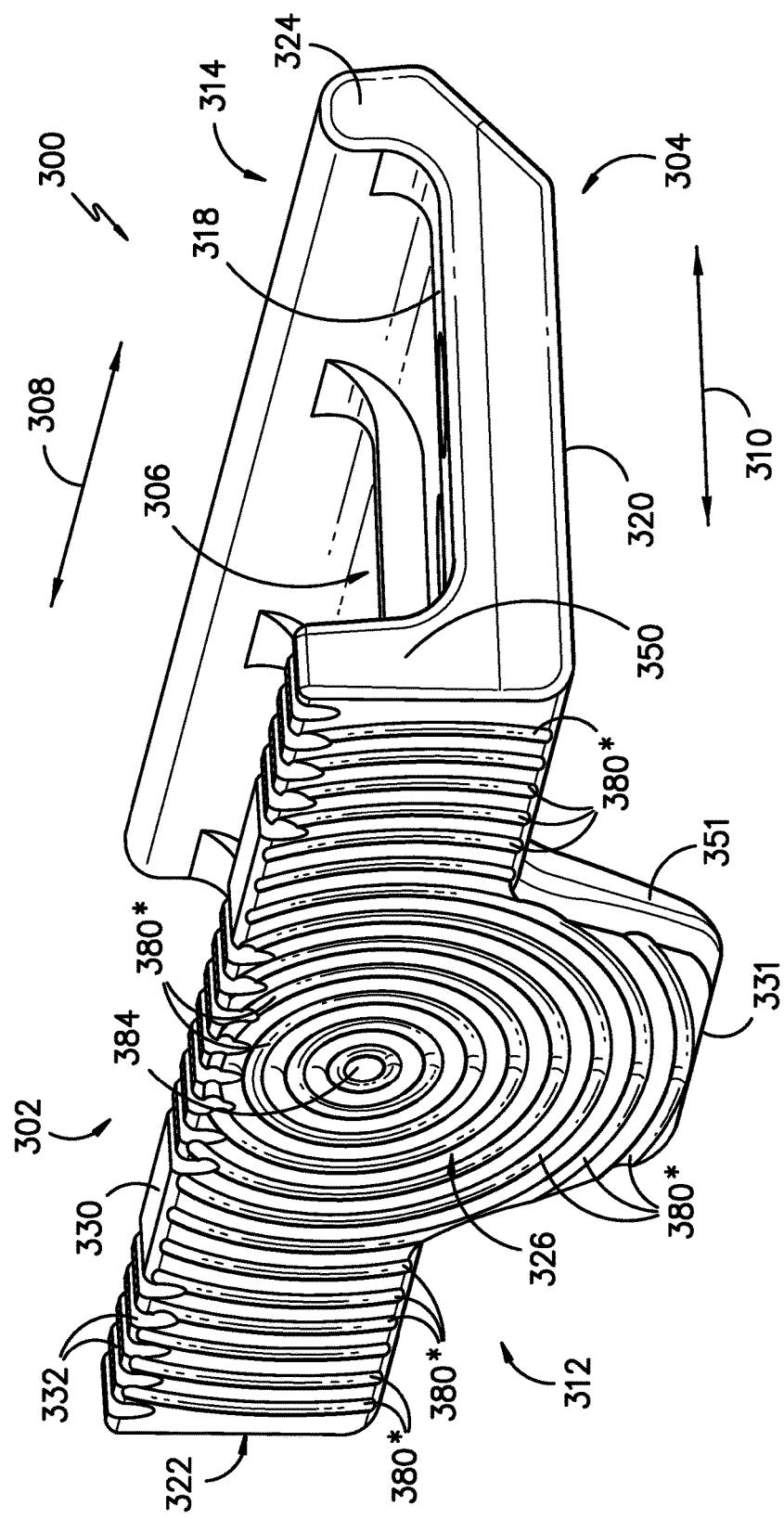
FIG. -15-

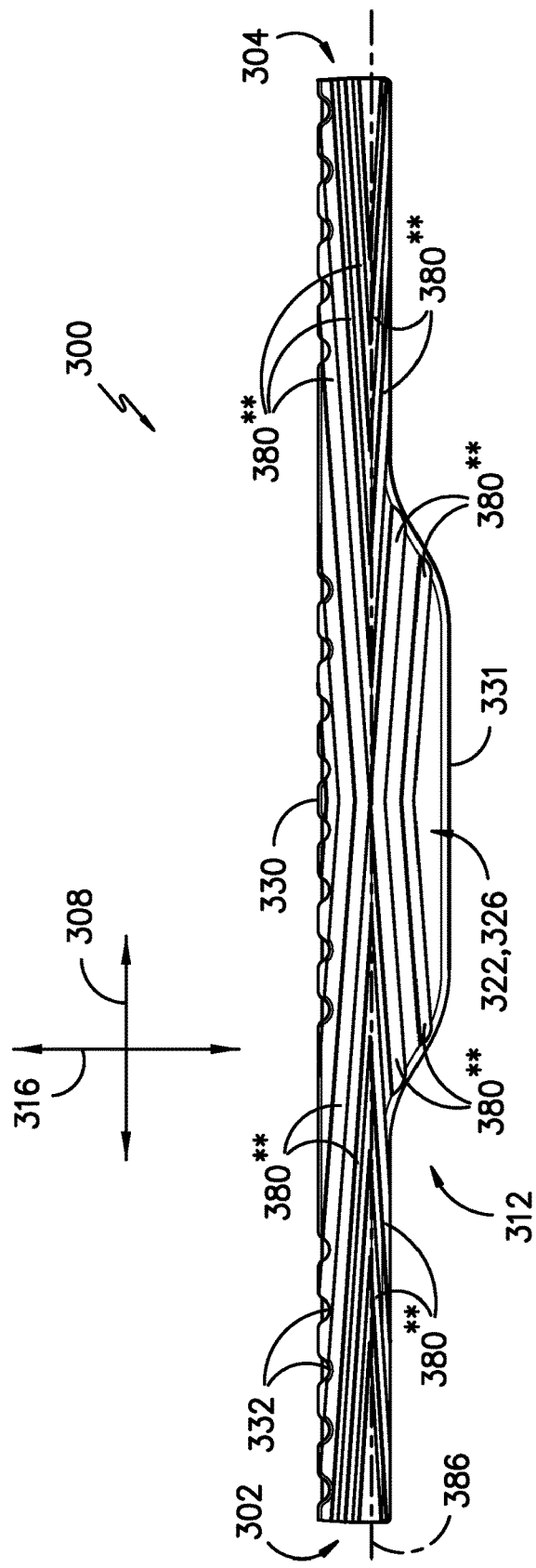
FIG. -16-

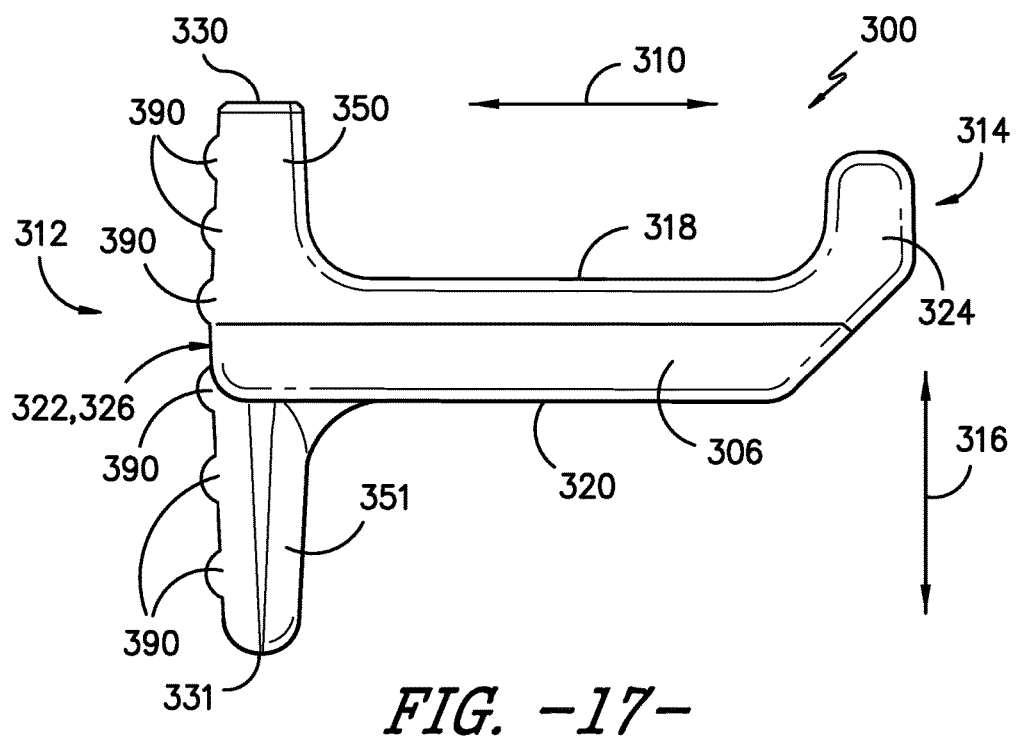
FIG. -17-
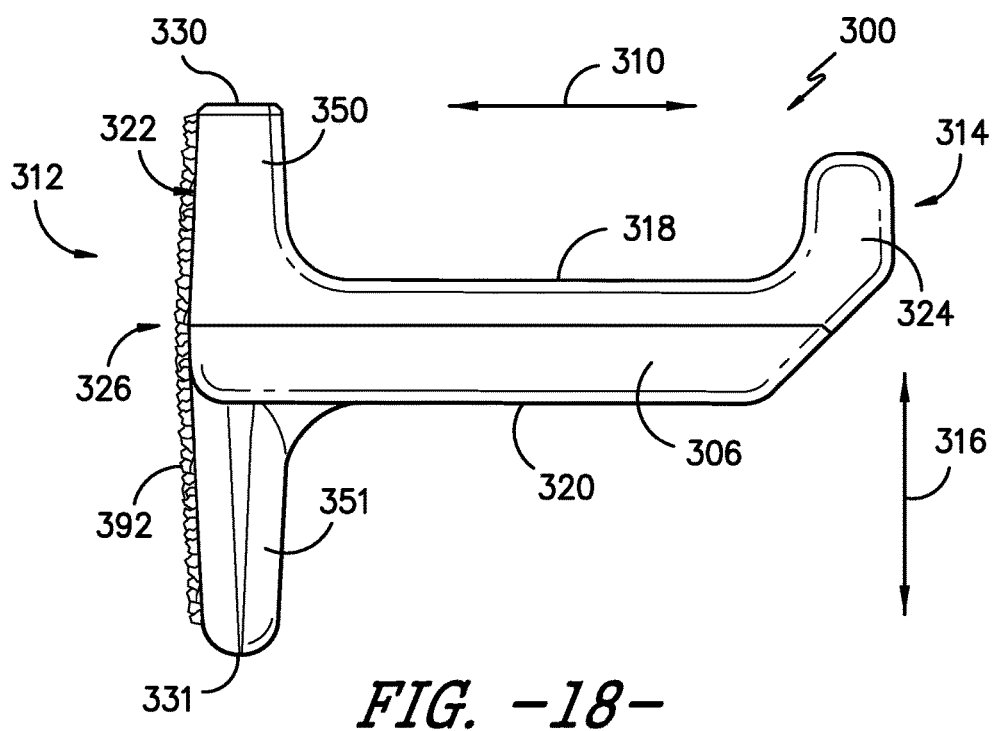
FIG. -18-

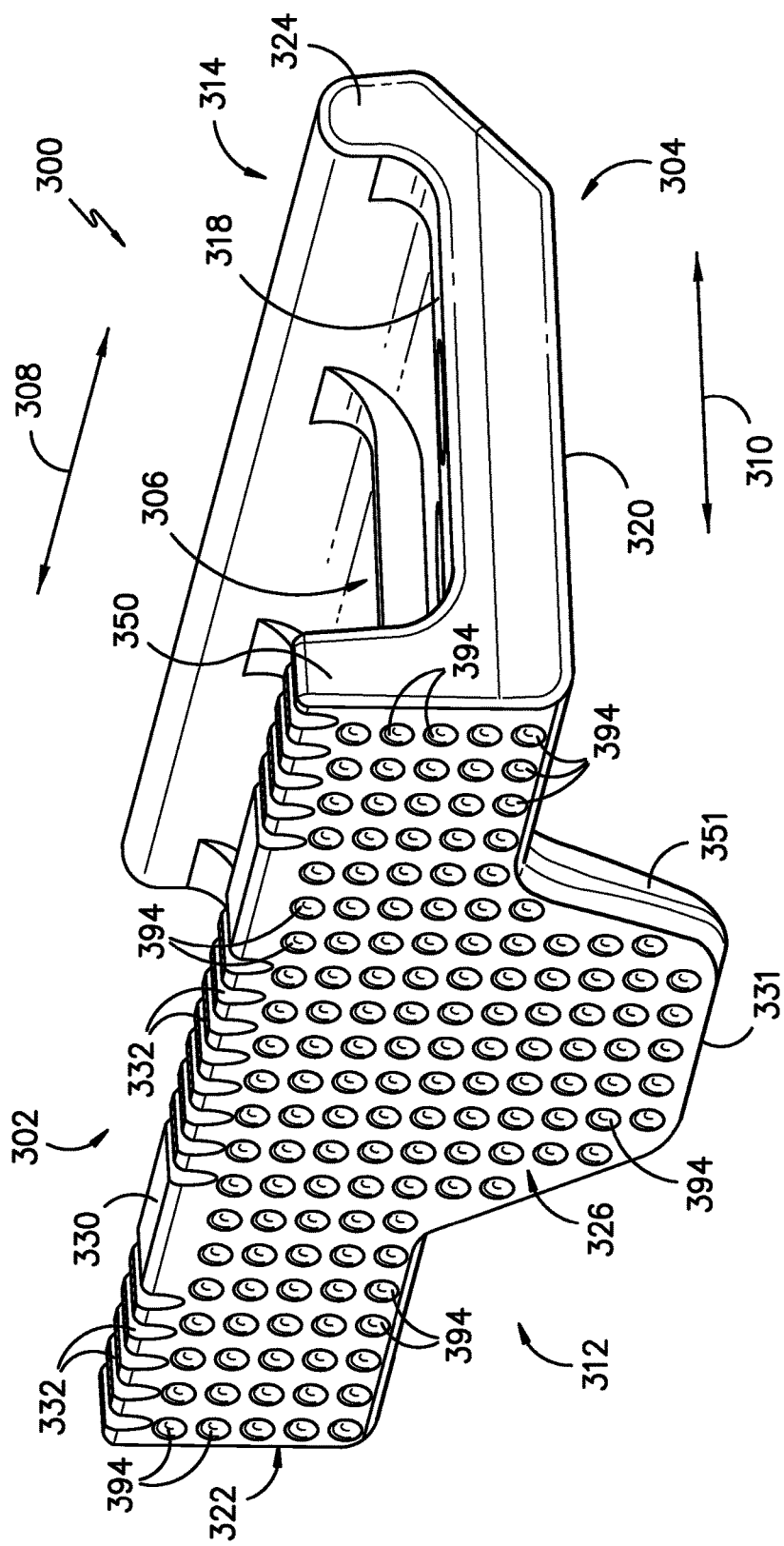
FIG. -19-

SLATS FOR USE WITHIN A MATERIAL MOVING SYSTEM OF AN AGRICULTURAL COMBINE

FIELD OF THE INVENTION

The present subject matter relates generally to material moving systems for agricultural combines and, more particularly, to improved slats for use within a material moving system of an agricultural combine.

BACKGROUND OF THE INVENTION

Agricultural harvesting machines, such as combines, are generally designed to handle a large variety of crops. For example, a combine may be used to harvest small grain crops (e.g., wheat or rye), grass seed, or large grain crops, (e.g., peas or corn). Conventionally, a combine is equipped with a detachable crop collecting attachment, such as a grain or corn header, which cuts the stems of the crop standing in the field and conveys the same to the inlet of a material moving system. Alternatively, crop which has been cut previously can be lifted up from the field by a pick-up attachment and conveyed to the material moving system. The material moving system, in turn, typically includes a chain elevator with transverse slats that pick up the collected crop deposited in front of the inlet and convey it rearwardly and upwardly towards the crop processing mechanism of the combine (e.g., a threshing and separating assembly).

In general, the transverse slats of the material moving system must be designed to be structurally robust. For instance, foreign objects, such as rocks, pieces of timber, or other objects conveyed to the inlet of the material moving system along with crop material, can cause an abrupt seizure of the material movement system. Such seizures subject the slats to significant loads which may result in a permanent deformation of the slats. Moreover, due to the increasing capacity of modern combines, the structural integrity of the transverse slats, in general, is becoming more of an important design consideration.

Additionally, as material throughput for modern combines is increased, an additional emphasis must be placed on the material moving efficiency of the slats. For example, with increased throughput, material may often bottleneck at the transition between the header and the material moving system due to the slats failing to properly grab and convey the material into the moving system in an efficient and effective manner. This can lead to crop "boiling" or churning at the inlet of the material moving system.

Accordingly, an improved slat configuration for transverse slats of a material moving system of an agricultural combine that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a slat for use within a material moving system of an agricultural combine. The slat may include a connector web extending in a lengthwise direction of the slat between a first end and a second end and in a widthwise direction of the slat between a front side and a rear side of the slat. The connector web may also define an outer surface and an inner surface. The slat may also include a front wall extending outwardly from the outer surface of the connector web along the front side of the slat and a rear wall extending outwardly from the outer surface of the connector web along the rear side of the slat. Additionally, the slat may include an outer rib extending outwardly from the outer surface of the connector web. The outer rib may extend in the lengthwise direction between the first and second ends of the connector web and may be spaced apart from the front and rear walls in the widthwise direction of the slat.

In another aspect, the present subject matter is directed to a slat for use within a material moving system of an agricultural combine. The slat may include a connector web extending in a lengthwise direction of the slat between a first end and a second end and in a widthwise direction of the slat between a front side and a rear side of the slat. The connector web may also define an outer surface and an inner surface. The slat may also include a front wall extending outwardly relative to the connector web along the front side of the slat. The front wall may define a front face of the slat, with the front face extending in a heightwise direction of the slat between an inner end and an outer end. In addition, the slat may include a rear wall extending outwardly relative to the connector web along the rear side of the slat. Moreover, the slat may include a front edge portion projecting outwardly from the front wall in a direction opposite the rear side of the slat at a location adjacent to the outer end of the front wall such that the front face of the slat defines a non-planar profile.

In a further aspect, the present subject matter is directed to a slat for use within a material moving system of an agricultural combine. The slat may include a connector web extending in a lengthwise direction of the slat between a first end and a second end and in a widthwise direction of the slat between a front side and a rear side of the slat. The connector web may also define an outer surface and an inner surface. The slat may also include a front wall extending outwardly relative to the connector web along the front side of the slat. The front wall may define a front face of the slat, with the front face extending in a heightwise direction of the slat between an inner end and an outer end. Additionally, the slat may include a rear wall extending outwardly relative to the connector web along the rear side of the slat. Moreover, at least a portion of the front face of the slat may be textured between the outer and inner ends of the front wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, partial sectional side view of one embodiment of an agricultural combine in accordance with aspects of the present subject matter;

FIG. 2 illustrates a cross-sectional view of one embodiment of a material moving system suitable for use within an agricultural combine in accordance with aspects of the present subject matter;

FIG. 3 illustrates an enlarged, partial cross-sectional view of a rear end of the material moving system shown in FIG. 2;

FIG. 4 illustrates a perspective view of one embodiment of a slat suitable for use within a material moving system in accordance with aspects of the present subject matter;

FIG. 5 illustrates an end view of the slat shown in FIG. 4;

FIG. 6 illustrates a cross-sectional view of the slat shown in FIG. 4 taken about line 6-6;

FIG. 7 illustrates a perspective view of another embodiment of a slat suitable for use within a material moving system in accordance with aspects of the present subject matter;

FIG. 8 illustrates an end view of the slat shown in FIG. 7;

FIG. 9 illustrates an end view of a further embodiment of a slat suitable for use within a material moving system in accordance with aspects of the present subject matter;

FIG. 10 illustrates a top view of yet another embodiment of a slat suitable for use within a material moving system in accordance with aspects of the present subject matter;

FIG. 11 illustrates a perspective view of an even further embodiment of a slat suitable for use within a material moving system in accordance with aspects of the present subject matter;

FIG. 12 illustrates an end view of the slat shown in FIG. 11;

FIG. 13 illustrates a perspective view of another embodiment of a slat suitable for use within a material moving system in accordance with aspects of the present subject matter;

FIG. 14 illustrates an end view of a further embodiment of a slat suitable for use within a material moving system in accordance with aspects of the present subject matter;

FIG. 15 illustrates a perspective view of yet another embodiment of a slat suitable for use within a material moving system in accordance with aspects of the present subject matter;

FIG. 16 illustrates a front view of an even further embodiment of a slat suitable for use within a material moving system in accordance with aspects of the present subject matter;

FIG. 17 illustrates an end view of another embodiment of a slat suitable for use within a material moving system in accordance with aspects of the present subject matter;

FIG. 18 illustrates an end view of a further embodiment of a slat suitable for use within a material moving system in accordance with aspects of the present subject matter; and FIG. 19 illustrates a perspective view of yet another embodiment of a slat suitable for use within a material moving system in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved slat configurations for a transverse slat used within a material moving system of an agricultural combine. Specifically, in several embodiments, the disclosed slat may include a connector web and front and rear walls extending outwardly from an outer surface of the connector web along front and rear sides of the slat, respectively. Additionally, in one embodiment, the slat may include both an outer rib and an inner rib extending outwardly from the connector web at locations between the front and rear sides of the slat. Specifically, the outer rib may be configured to extend from the outer surface of the connector web between the front and rear walls of the slat while the inner rib may be configured to extend from an opposed inner surface of the connector web. The ribs may generally provide the slat with additional structural integrity. For instance, the ribs may serve to reduce the bending stresses acting on the slat during operation of the material moving system.

Moreover, in several embodiments, the slat may include an additional crop grabbing/gripping means provided at or adjacent to its front side. Specifically, in one embodiment, the slat may include a front edge portion extending outwardly from its front wall adjacent to the outer end of the front wall that is configured to grab/grip crop material as the slat is conveyed past an outlet of the combine's header. Additionally, in one embodiment, all or a portion of a front face of the slat may be textured (e.g., by including a plurality of surface features, such as channels, ribs, dimples, or the like, formed on the front face and/or by having a textured coating applied thereon) to provide an additional crop gripping/grabbing surface of the slat.

Referring now to the drawings, FIG. 1 illustrates a simplified, partial sectional side view of one embodiment of an agricultural combine 10 in accordance with aspects of the present subject matter. As shown, the combine 10 is configured as an axial-flow type combine, wherein crop material is threshed and separated while it is advanced by and along a longitudinally arranged rotor 12. The combine 10 may include a chassis or main frame 14 having a pair of driven, ground-engaging front wheels 16 and a pair of steerable rear wheels 18. Additionally, an operator's platform 20 with an operator's cab 22, a threshing and separating assembly 24, a grain cleaning assembly 26, a holding tank 28 and an engine 30 may be supported by the frame 14. Moreover, as shown in FIG. 1, a header 32 and a material moving system 34 may extend forward of the main frame 14 and may be pivotally secured thereto for generally vertical movement, which may be controlled by appropriate actuators, such as hydraulic cylinders (not shown). In general, the material moving system 34 may extend between a forward end 36 positioned adjacent to an outlet 40 of the header 32 and a rear end 38 positioned adjacent to the threshing and separating assembly 24.

As the combine 10 is propelled forwardly over a field with standing crop, the latter is severed from the stubble by a sickle bar 42 at the front of the header 32 and delivered by a header auger 44 to the forward end 36 of the material moving system 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed or the like, is loosened and separated from the straw.

Crop material which has been separated by the threshing and separating assembly 32 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the combine 10 through the outlet of a straw hood 54 positioned at the back end of the combine 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the combine 10.

Referring now to FIGS. 2 and 3, differing views of the material moving system 34 described above are illustrated in accordance with aspects of the present subject matter. Specifically, FIG. 2 illustrates a cross-sectional, side view of the material moving system 34 and FIG. 3 illustrates an enlarged, partial cross-sectional side view of the rear end of the material moving system 34.

As particularly shown in FIG. 2, the material moving system 34 may include a substantially parallelepiped structure or housing 70 which is pivotably secured to the main frame 14 below the operator's platform 20. The housing 70 may include an upper wall 72 and a lower wall 74, interconnected by a pair of side walls 76. The material moving system 34 may also include a transverse drive shaft 78 at its rear end 38 that extends through the side walls 76 and is provided with a plurality of sprockets 80 (e.g., four sprockets). Additionally, at the front end 36 of the material moving system 34, a drum 82 may be installed for rotation between the side walls 76. The front drum 82 may include a shaft 84 extending through apertures in the side walls 76 that is received in bearings 86 mounted to corresponding pivot arms 88, with the rear ends of the arms 88 being pivotably affixed to the outside of the side walls 76 at pivots 90.

Moreover, the material moving system 34 may include a plurality of endless, flexible members or continuous loops of flexible material, e.g. chains 92, which are trained along parallel paths over the sprockets 80 and the front drum 82 to form an elevator 94, with the elevator 94 being driven by the sprockets 80 positioned the drive shaft 78. Additionally, as particularly shown in FIG. 3, a plurality of transverse slats 100 may be mounted to the chains 92 so as to extend across the width of the elevator 94. Further, the lower wall 74 of the housing 70 may, optionally, include a wear plate (not shown) along which a lower run 96 of the elevator 94 conveys the harvested crop to the inlet of the threshing and separating assembly 24.

During operation of the material moving system 34, the drive shaft 78 may be rotated to allow the slats 100 to be conveyed by the elevator 94 in a looped path (e.g., as indicated by arrows 97 in FIGS. 2 and 3) between the front and rear ends 36, 38 of the material moving system 34. As the slats 100 are conveyed adjacent to the front drum 82, the slats 100 may be configured to engage and convey the crop material delivered thereto from the header 32. The slats 100 may then convey the crop rearwardly and upwardly between the lower run 96 of the elevator 94 and the lower wall 74 of the housing (or the wear plate, if present) to the rear end 38 of the material moving system 34, where the crop is combed away from the elevator 94 by the front end of the threshing rotor 12.

Referring now to FIGS. 4-6, one embodiment of a slat 100 suitable for use within a material moving system of an agricultural combine is illustrated in accordance with aspects of the present subject matter. Specifically, FIG. 4 illustrates a perspective view of the slat and FIG. 5 illustrates an end view of the slat 100 shown in FIG. 4. Additionally, FIG. 6 illustrates a cross-sectional view of the slat 100 shown in FIG. 4 taken about line 6-6.

As shown in the illustrated embodiment, the slat 100 may generally correspond to elongated structural member extending lengthwise between a first end 102 and a second end 104. In general, the slat 100 may include a central or connector web 106 extending in the lengthwise direction of the slat 100 (indicated by arrow 108 in FIGS. 4 and 6) between the first and second ends 102, 104 of the slat 100 and in the widthwise direction of the slat 100 (indicated by arrow 110 in FIG. 5) between a front side 112 and a rear side of the slat 114. The connector web 106 may also extend in the heightwise direction of the slat 100 (indicated by arrow 116 in FIG. 5) between an outer surface 118 and an inner surface 120. Additionally, the slat 100 may include a front wall 122 and a rear wall 124, with the front wall 122 extending outwardly from the outer surface 118 of the connector web 106 along the front side 112 of the slat 100 and the rear wall 124 extending outwardly from the outer surface 118 of the connector web 106 along the rear side 114 of the slat 100.

It should be appreciated that the terms "front" and "rear" are generally used herein to refer to the positioning of portions or components of the slat 100 relative to the direction of travel of the slat 100 along the elevator 94. For example, the front side 112 of the slat 100 may generally correspond to the "leading side" of the slat 100 with respect to the direction of travel such that a front face 126 (FIG. 5) of the front wall 122 is used to push the crop material along the gap defined between the elevator 94 and the lower wall 74 of the housing 70 as the slat 100 travels from the front end 36 to the rear end 38 of the material moving system 34 along the lower elevator run 96. Similarly, the rear side 114 of the slat 100 may generally correspond to the "trailing side" of the slat 100 with respect to the direction of travel.

It should also be appreciated that the terms "outer" and "inner" are generally used herein to refer to the positioning of portions or components of the slat 100 relative to the elevator 94. For example, the outer surface 118 of the connector web 106 may correspond to the surface of the web 106 that faces outwardly or away from the elevator 94 in the direction of the walls 72, 74 of the housing 70 as the slat 100 is moved along the continuous loop defined by the elevator 94. Similarly, the inner surface 120 of the connector web 106 may correspond to the surface of the web 106 that faces towards the interior of the elevator 94 as the slat 100 is moved along the continuous loop defined by the elevator 94. Thus, for example, as shown in the illustrated embodiment, the front and rear walls 122, 124 extend from the connector web 106 along the outer side of the slat 100 to facilitate the conveyance of crop material through the material moving system 34.

As is indicated above, the slat 100 may be configured to be coupled to the elevator 94 of the material moving system 34. For instance, a plurality of fastener openings 128 may be defined through the connector web 106 to facilitate coupling the slat 100 to the continuous chain loops 92 of the elevator 94. Specifically, as shown in FIG. 6, a pair of openings 128 may be defined in the connector web 106 adjacent to each lateral end 102, 104 of the slat 100. In such an embodiment, each pair of openings 128 may be configured to be coupled to one of the chain loops 92 of the elevator 94.

As particularly shown in FIGS. 4 and 6, in one embodiment, an outer end 130 of the front wall 122 may be ribbed or notched along all or a portion of the length of the front wall 122. Such notches 132 may generally be designed to assist in grabbing or gripping crop material from the outlet 40 of the header 32. For instance, as the slat 100 is conveyed around the front drum 82, the notched outer end 130 of the front wall 122 may grab additional crop material from the header outlet 40 and pull it downwardly towards the lower wall 74 of the housing 70 so that it can be conveyed towards the rear end 38 of the material moving system 34.

Additionally, the slat 100 may also include an outer rib 134 and an inner rib 136 extending outwardly from the opposed outer and inner surfaces 118, 120, respectively, of the connector web 106. For instance, as shown in FIG. 5, the outer rib 134 may extend outwardly from the outer surface 118 of the connector web 106 at a location between the front and rear walls 122, 124 of the slat 100 such that the outer rib 134 is spaced apart from the front and rear walls 122, 124 in the widthwise direction 110 of the slat 100. Similarly, the inner rib 136 may extend outwardly from the inner surface 120 of the connector web 106 so that the inner rib 136 extends heightwise from the connector web 106 in a direction opposite the front and rear walls 122, 124 and the outer rib 134, with the inner rib 136 being similarly spaced apart from the front and rear walls 122, 124 in the widthwise direction 110 of the slat 100. As shown in FIG. 5, in one embodiment, both the outer rib 134 and the inner rib 136 may be centrally located between the front and rear sides 112, 114 of the slat 100, such as by aligning the outer and inner ribs 134, 136 with one another along the widthwise direction 110 of the slat 100. As such, the slat 100 may define a trident-like shape when viewed from one of its ends 102, 104 (e.g., as shown in FIG. 5).

It should be appreciated that, in general, the ribs 134, 136 may be configured to provide additional stiffness and structural integrity to the slat 100. For instance, by adding the outer and inner ribs 134, 136, the slat 100 may be subjected to significantly reduced bending (fatigue) stresses during operation of the material moving system 34. As a result, the disclosed slat 100 may be designed to span the full width of the elevator 94 without being subject to endurance issues, which may significantly reduce the cost and weight of the material moving system 34. For instance, many conventional slats must be split in two so that each slat section only spans half of the full width of the elevator, thereby requiring additional elevator components (e.g., additional chain loops) to support the split slat.

As shown in FIG. 5, the outer rib 134 may define a rib height 138 relative to the outer surface 118 of the connector web 106. In one embodiment, the rib height 138 of the outer rib 134 may be less than a corresponding wall height 140 of the front wall 122 and greater than a corresponding wall height 142 of the rear wall 124. In such an embodiment, the heightwise profile of the slat 100 may be staggered downwardly from the front wall 122 to the rear wall 124 of the slat 100. Additionally, as shown in FIG. 5, the inner rib 136 may define a rib height 144 relative to the inner surface 120 of the connector web 106. In one embodiment, the rib height 144 of the inner rib 136 may be equal to the rib height 138 of the outer rib 134. Alternatively, the rib height 144 of the inner rib 136 may be greater than or less than the rib height 138 of the outer rib 134.

Additionally, as shown in FIG. 6, each rib 134, 136 may define a rib length 146 extending between the first and second ends 102, 104 of the slat 100. In one embodiment, the rib length 146 of each rib 134, 136 may be equal to greater than about 40% of a total length 148 of the slat 100 (e.g., defined from its first end 102 to its second end 104), such as greater than 50% of the total length 148 of the slat 100 or greater than 60% of the total length 148 of the slat 100 or greater than 70% of the total length 148 of the slat 100. As shown in FIG. 6, in one embodiment, the specific rib length 146 of the ribs 134, 136 may be selected such that the ribs 134, 136 extend lengthwise within the lateral distance defined between the opposed fastener openings 128 of the connector web 106. It should be appreciated that, although the outer and inner ribs 134, 136 are shown in FIG. 6 as defining the same rib length 146, each rib 134, 136 may define a rib length 146 that differs from the rib length of the other rib.

It should also be appreciated that the slat 100 shown in FIGS. 4-6 may generally be formed using any suitable manufacturing method and/or means. However, in a particular embodiment, the slat 100 may be manufactured as a casting, with the entire slat 100 being formed as a single, unitary component. Additionally, it should be appreciated that the slat 100 may generally be formed from any suitable material. However, in a particular embodiment, the slat 100 may be formed from austempered ductile iron (ADI).

Referring now to FIGS. 7 and 8, another embodiment of a slat 200 suitable for use within a material moving system of an agricultural combine is illustrated in accordance with aspects of the present subject matter. Specifically, FIG. 7 illustrates a perspective view of the slat 200. Additionally, FIG. 8 illustrates an end view of the slat 200 shown in FIG. 7.

As shown, the slat 200 may generally correspond to elongated structural member extending lengthwise between a first end 202 and a second end 204. In general, the slat 200 may include a central or connector web 206 extending in a lengthwise direction of the slat 200 (e.g., as indicated by arrow 208 in FIG. 7) between the first and second ends 202, 204 of the slat 200 and in a widthwise direction of the slat 200 (e.g., as indicated by arrow 210 in FIGS. 7 and 8) between a front side 212 and a rear side 214 of the slat 200. The connector web 206 may also extend in a heightwise direction of the slat 200 (e.g., as indicated by arrow 216 in FIG. 8) between an outer surface 218 and an inner surface 220. Additionally, the slat 200 may include a front wall 222 and a rear wall 224, with the rear wall 224 extending outwardly from the outer surface 218 of the connector web 206. As shown, the front wall 222 may include both an outer wall portion 250 extending outwardly relative to the outer surface 218 of the connector web 206 to an outer end 230 of the front wall 222 and an inner wall portion 252 extending outwardly relative to the inner surface 220 of the connector web 206 to an inner end 231 of the front wall 222. The outer and inner wall portions 250, 252 (along with the front end of the connector web 206) may generally define a front face 226 of the slat 200 such that the front face 226 extends between the outer and inner ends 230, 231 of the front wall 222.

As shown in the illustrated embodiment, the inner wall portion 252 of the front wall 222 may be configured to extend outwardly relative to the inner surface 220 of the connector web 206 along only a portion of an overall length 248 of the slat 200. For instance, in several embodiments, the inner wall portion 252 may define a length 260 that is equal to less than about 50% of the overall length 248 of the slat 200, such as less than about 40% of the overall length 248 of the slat 200 or less than about 30% of the overall length 248 of the slat 200 and/or any other subranges therebetween.

As particularly shown in FIG. 7, in one embodiment, the outer end 230 of the front wall 222 may be ribbed or notched along at least a portion the length 248 of the slat 200. As indicated above, such notches 232 may generally be designed to assist in grabbing or gripping crop material from the outlet 40 of the header 32. For instance, as the slat 200 is conveyed around the front drum 82, the notched outer end 230 of the front wall 222 may grab additional crop material from the header outlet 40 and pull it downwardly towards the lower wall 74 of the housing 79 so that it can be conveyed towards the rear end 38 of the material moving system 34.

Additionally, as shown in the illustrated embodiment, the slat 200 may include a front edge portion 262 projecting outwardly from the front wall 222 in a direction opposite the rear side 214 of the slat 200 such that the front face 226 of the slat 200 defines a non-planar profile. Specifically, in several embodiments, the front edge portion 262 may be configured to project outwardly from the front wall 222 at a location directly adjacent to the outer end 230 of the front wall 222. Similar to the notched outer end 230 of the front wall 222, the front edge portion 262 may be configured to provide an additional crop grabbing/gripping means for the slat 200. Specifically, as the slat 200 is conveyed around the front drum 82, the front edge portion 262 of the slat 200 may facilitate enhanced grabbing/gripping of the crop material from the header outlet 40.

In one embodiment, the front edge portion 262 may be configured to define a curved profile along the front face 226 of the slat 200 such that the front edge portion 262 is curved outwardly in the direction opposite the rear side 214 of the slat 200. For instance, as shown in FIG. 8, the front edge portion 262 may define a continuously curved surface 264 between an inner side 266 of the front edge portion 262 (e.g., the location at which the front face 226 transitions from a planar profile to a non-planar profile) and the outer end 230 of the front wall 222. In such an embodiment, the front edge portion 262 may generally define a hooked shape or profile.

Additionally, the front wall 222 may also define a back edge portion 268 located adjacent to its outer end 230 that is opposite the front edge portion 262 of the front wall 222. As particularly shown in FIG. 8, in one embodiment, when the front edge portion 262 is configured to define a curved profile, the back edge portion 268 may also be configured to define a curved profile such that the back edge portion 268 is similarly curved outwardly in the direction opposite the rear side 214 of the slat 200. For instance, the front and back edge portions 262, 268 may be configured to define matching or similar curved profiles.

It should be appreciated that, in other embodiments, the front edge portion 262 of the front wall 222 may be configured to define any other suitable shape and/or profile. For instance, FIG. 9 illustrates an end view of another embodiment of the slat 200 shown in FIGS. 7 and 8. As shown, as opposed to the curved profile, the front edge portion 262' defines a bend or bent profile projecting outwardly from the front wall 222 in the direction opposite the rear side 214 of the slat 200. For instance, the front edge portion 262' may be configured to extend perpendicularly from the front wall 222. Alternatively, the front edge portion 262' may be configured to extend outwardly from the front wall 222 at any other suitable angle relative to the widthwise direction 210 of the slat 200.

Additionally, it should be appreciated that, in one embodiment, the front edge portion 262, 262' of the front wall 222 may be notched along all or a portion of its length. For instance, FIG. 10 illustrates a top view of the slat 200 shown in FIG. 9, with the front edge portion 262' defining a plurality of notches 270 along the length of the slat 200. In such an embodiment, both the front edge portion 262' and the outer end 230 of the front wall 222 may be notched (e.g., as shown in FIG. 10). Alternatively, the front edge portion 262' may be notched as an alternative to notching the outer end 230 of the front wall 222.

Referring now to FIGS. 11 and 12, a further embodiment of a slat 300 suitable for use within a material moving system of an agricultural combine is illustrated in accordance with aspects of the present subject matter. Specifically, FIG. 11 illustrates a perspective view of the slat. Additionally, FIG. 12 illustrates an end view of the slat 300 shown in FIG. 11.

In general, the slat 300 may be configured similarly to the slat 200 described above with reference to FIGS. 7-10. For instance, the slat 200 may correspond to elongated structural member extending lengthwise between a first end 302 and a second end 304. As shown in the illustrated embodiment, the slat 300 may include a central or connector web 306 extending in a lengthwise direction of the slat 300 (e.g., as indicated by arrow 308 in FIG. 11) between the first and second ends 302, 304 of the slat 300 and in a widthwise direction of the slat 300 (e.g., as indicated by arrow 310 in FIGS. 11 and 12) between a front side 312 and a rear side 314 of the slat 300. The connector web 306 may also extend in a heightwise direction of the slat 300 (e.g., as indicated by arrow 316 shown in FIG. 12) between an outer surface 318 and an inner surface 320. Additionally, the slat 300 may include a front wall 322 and a rear wall 324, with the rear wall 324 extending outwardly relative to the outer surface 318 of the connector web 306. As shown, the front wall 322 may include both an outer wall portion 350 extending outwardly relative to the outer surface 318 of the connector web 306 to an outer end 330 of the front wall 322 and an inner wall portion 351 extending outwardly relative to the inner surface 320 of the connector web 320 to an inner end 331 of the front wall 322. The outer and inner wall portions 350, 351 (along with the front end of the connector web 306) may generally define a front face 326 of the slat 300 such that the front face 326 extends between the outer and inner ends 330, 331 of the front wall 322.

As particularly shown in FIG. 11, similar to the embodiments described above, the outer end 330 of the front wall 322 may be ribbed or notched along at least a portion the length of the slat 300. As indicated above, such notches 332 may generally be designed to assist in grabbing or gripping crop material from the outlet 40 of the header 32. For instance, as the slat 300 is conveyed around the front drum 82, the notched outer end 330 of the front wall 322 may grab additional crop material from the header outlet 40 and pull it downwardly towards the lower wall 74 of the housing 70 so that it can be conveyed towards the rear end 38 of the material moving system 34.

Additionally, in several embodiments, the front face 326 of the slat 300 may be textured between the outer and inner ends 330, 331 of the front wall 322. Similar to the notched outer end 330 of the front wall 322, the textured front face 326 may be configured to provide the slat 300 with an improved crop grabbing/gripping surface. Specifically, as the slat 300 is conveyed around the front drum 82, the textured front face 326 of the slat 300 may facilitate enhanced grabbing/gripping of the crop material from the header outlet 40.

In general, the front face 326 of the slat 300 may be textured using any suitable means and/or methodology known in the art. For instance, in several embodiments, the front face 326 may be textured by forming one or more suitable surface feature(s) along the front face 326 of the slat (e.g., recessed channels, raised ribs, dimples, and/or the like). Alternatively, the front face 326 of the slat 300 may be textured by adding or applying a textured material thereon.

For example, in the illustrated embodiment, a plurality of discrete troughs or recessed channels 380 may be defined in the front face 326 of the slat 300. As shown in FIG. 11, the recessed channels 380 may be configured to extend lengthwise along the front face 326 between the first and second longitudinal ends 302, 304 of the slat 300. Additionally, as shown in FIG. 12, the recessed channels 380 may be spaced apart from one another in the heightwise direction 316 of the slat 300 between the outer and inner ends 330, 331 of the front wall 322.

Referring now to FIG. 13, a perspective view of another embodiment of the slat 300 shown in FIGS. 11 and 12 is illustrated in accordance with aspects of the present subject matter, particularly illustrating another configuration for the textured front face 326 of the slat 300. As shown in FIG. 13, unlike the discrete recessed channels 380 described above with reference to FIGS. 11 and 12, the recessed channels 380' may be formed in a continuous manner so as to define a serrated pattern along the front face 326 in the heightwise direction (FIG. 12) of the slat 300. Specifically, in the illustrated embodiment, each recessed channel 380' may define straight or non-curved channel walls 382, with the ends of each channel wall 382 terminating at the location of the ends of adjacent channel walls 382 so as to form the continuous serrated pattern.

Referring now to FIG. 14, an end view of a further embodiment of the slat 300 shown in FIGS. 11 and 12 is illustrated in accordance with aspects of the present subject matter, particularly illustrating another configuration for the textured front face 326 of the slat 300. As shown, unlike the straight-walled recessed channels 380' described above with reference to FIG. 13, the recessed channels 380" define curved channel walls 382". In such an embodiment, the front face 326 of the slat 300 may define an undulating or wavy pattern between the outer and inner ends 330, 331 of the front wall 322. For instance, in the illustrated embodiment, adjacent recessed channels 380" may be configured to define an "S-shaped" profile along a portion of the height of the front face 326.

Referring now to FIG. 15, a perspective view of yet another embodiment of the slat 300 shown in FIGS. 11 and 12 is illustrated in accordance with aspects of the present subject matter, particularly illustrating another configuration for the textured front face 326 of the slat 300. As shown, unlike the longitudinally extending recessed channels 380, 380', 380" described above with reference to FIGS. 11-14, the slat 300 includes circular and/or semi-circular recessed channels 380* defined in its front face 326. Specifically, in the illustrated embodiment, each recessed channel 380* may define all or part of one of a plurality of concentric circles extending from one or more center points 384 of the pattern. In such an embodiment, the recessed channels 380* may define a rippled pattern across the front face 326 of the slat 300. It should be appreciated that the center point 384 of the pattern may be defined at any suitable location along the front face 326 of the slat 300.

Referring now to FIG. 16, a front view of an even further embodiment of the slat 300 shown in FIGS. 11 and 12 is illustrated in accordance with aspects of the present subject matter, particularly illustrating another configuration for the textured front face 326 of the slat 300. As shown, unlike the longitudinally extending recessed channels 380, 380', 380" described above with reference to FIGS. 11-14, the slat 300 includes recessed channels **380\*\* formed in an "X-shaped" pattern along the front face 326 of the slat 300. Specifically, as shown in the illustrated embodiment, the "X-shaped" pattern may include a heightwise dividing line (e.g., as indicated by dashed line 386), with the recessed channels 380\*\* formed in the front face 326 between the dividing line 386 and the outer end 330 of the front wall 332 being angled outwardly from the dividing line 386 towards the outer end 330 and the recessed channels 380\*\* formed in the front face 326 between the dividing line 386 and the inner end 331 of the front wall 326 being angled outwardly from the dividing line 386 towards the inner end 331. It should also be appreciated that a plurality of "X-shaped" patterns may be formed across the front face 326 of the slat 300**.

Referring now to FIG. 17, an end view of another embodiment of the slat 300 shown in FIGS. 11 and 12 is illustrated in accordance with aspects of the present subject matter, particularly illustrating another configuration for the textured front face 326 of the slat 300. As shown, unlike the discrete recessed channels 380 described above with reference to FIGS. 11 and 12, the slat 300 includes a plurality of discrete raised ribs 390 formed along the front face 326 of the slat 300. Similar to the recessed channels 380 described above with reference to FIGS. 11 and 12, the raised ribs 390 may be configured to extend lengthwise along the front face 326 between the first and second longitudinal ends 302, 304 of the slat 300. Additionally, as shown in FIG. 17, the raised ribs 390 may be spaced apart from one another in the heightwise direction 316 of the slat 300 between the outer and inner ends 330, 331 of the front wall 322.

It should be appreciated that the ribs 390 shown in FIG. 17 may be provided in any suitable pattern along and/or across the front face 326, including any of the patterns described above with reference to the recessed channels. For instance, the ribs 390 may be formed in a rippled pattern (e.g., similar to that shown in FIG. 15) and/or an "X-shaped" pattern (e.g., similar to that shown in FIG. 16).

Referring now to FIG. 18, an end view of a further embodiment of the slat 300 shown in FIGS. 11 and 12 is illustrated in accordance with aspects of the present subject matter, particularly illustrating another configuration for the textured front face 326 of the slat 300. As shown, unlike the embodiments described above, the front face 326 includes a textured coating 392 disposed thereon. For instance, the textured coating 392 may correspond to any suitable material that may be applied onto the front face 326 (e.g., via thermal spaying, adhesives, and/or the like) so as to increase its surface roughness and/or coefficient of friction. Examples of suitable coating materials may include, but are not limited to, silica sand with a binder, garnet sand with a binder, masticated rubber, polyurethane, spray and fuse hard-facing materials and/or the like.

Referring now to FIG. 19, a perspective view of yet another embodiment of the slat 300 shown in FIGS. 11 and 12 is illustrated in accordance with aspects of the present subject matter, particularly illustrating another configuration for the textured front face 326 of the slat 300. As shown, the slat 300 may include a plurality of dimples 394 formed along its front face 326, with the dimples 394 being spaced apart from one another in both the heightwise direction 316 (FIG.

12) and the lengthwise direction 308 of the slat 300. In one embodiment, the dimples 394 may be uniformly spaced across the front face 326 of the slat 300. Alternatively, the dimples 394 may be randomly or non-uniformly spaced across the front face 326 of the slats 300.

It should be appreciated that, although the various slat configurations have been described herein in isolation, two or more of the slat configurations may be utilized in combination. For instance, in one embodiment, the outer and inner ribs 134, 136 shown in FIGS. 4-6 may be utilized in combination with the raised front edge portion 262, 262' and/or the textured front face 326 described above. Similarly, in one embodiment, the raised front edge portion 262, 262' may be utilized in combination with the textured front face 326.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A slat for use within a material moving system of an agricultural combine, the slat comprising:
   an elongated slat member extending in a lengthwise direction between a first end and a second end and in a widthwise direction between a front side and a rear side, the elongated slat member comprising:
      a connector web extending in the lengthwise direction between the first and second ends and in the widthwise direction between the front and rear sides, the connector web defining an outer surface and an inner surface;
      a front wall extending outwardly from the outer surface of the connector web along the front side of the elongated slat member;
      a rear wall extending outwardly from the outer surface of the connector web along the rear side of the elongated slat member; and
      an outer rib extending outwardly from the outer surface of the connector web, the outer rib extending in the lengthwise direction between the first and second ends and being spaced apart from the front and rear walls in the widthwise direction of the elongated slat member.

2. The slat of claim 1, wherein the outer rib defines a rib height, wherein the rib height is less than a wall height of the front wall.

3. The slat of claim 2, wherein the rib height is greater than a wall height of the rear wall.

4. The slat of claim 1, further comprising an inner rib extending outwardly from the inner surface of the connector web, the inner rib extending in the lengthwise direction between the first and second ends and being spaced apart from the front and rear walls in the widthwise direction of the elongated slat member.

5. The slat of claim 4, wherein the outer and inner ribs are aligned in the widthwise direction of the elongated slat member.

6. The slat of claim 1, wherein the outer rib defines a rib length in the lengthwise direction, the rib length being greater than 40% of a total length of the elongated slat member defined between the first and second ends.

7. The slat of claim 1, wherein the elongated slat member is formed from austempered ductile iron.

8. A slat for use within a material moving system of an agricultural combine, the slat comprising:
   an elongated slat member extending in a lengthwise direction between a first end and a second end and in a widthwise direction between a front side and a rear side, the elongated slat member comprising:
      a connector web extending in the lengthwise direction between the first and second ends and in the widthwise direction between the front and rear sides, the connector web defining an outer surface and an inner surface;
      a front wall extending outwardly relative to the connector web along the front side of the elongated slat member, the front wall defining a front face of the elongated slat member, the front face extending in a heightwise direction of the elongated slat member between an inner end and an outer end; and
      a rear wall extending outwardly relative to the connector web along the rear side of the elongated slat member;
   wherein:
   the elongated slat member includes a front edge portion projecting outwardly from the front wall in a direction opposite the rear side of the elongated slat member at a location adjacent to the outer end of the front wall;
   the front edge portion extends in the heightwise direction of the elongated slat member along the front face of the elongated slat member from an inner side of the front edge portion to the outer end of the front wall; and
   the front edge portion defines a curved profile along the front face of the elongated slat member in the heightwise direction of the elongated slat member between the inner side of the front edge portion and the outer end of the front wall such that the front edge portion projects further away from the rear side of the elongated slat member at the outer end of the front wall than at the inner side of the front edge portion.

9. The slat of claim 8, wherein the curved profile defines a continuously curved surface between the inner side of the front edge portion and the outer side of the front edge portion.

10. A slat for use within a material moving system of an agricultural combine, the slat comprising:
    an elongated slat member extending in a lengthwise direction between a first end and a second end and in a widthwise direction between a front side and a rear side, the elongated slat member comprising:
       a connector web extending in the lengthwise direction between the first and second ends and in the widthwise direction between the front and rear sides, the connector web defining an outer surface and an inner surface;
       a front wall extending outwardly relative to the connector web along the front side of the elongated slat member, the front wall defining a front face of the elongated slat member, the front face extending in a heightwise direction of the elongated slat member between an inner end and an outer end; and
       a rear wall extending outwardly relative to the connector web along the rear side of the elongated slat member;

wherein:
the elongated slat member includes a front edge portion projecting outwardly from the front wall in a direction opposite the rear side of the elongated slat member at a location adjacent to the outer end of the front wall;
the front edge portion defines a curved profile along the front face of the elongated slat member such that the front edge portion is curved outwardly in the direction opposite the rear side of the elongated slat member; and
wherein the front wall further comprises a back edge portion opposite the front edge portion, the back edge portion defining a curved profile such that the back edge portion is curved outwardly in the direction opposite the rear side of the elongated slat member.

11. The slat of claim 8, wherein at least a portion of the front edge portion is notched along a length of the elongated slat member.

12. A slat for use within a material moving system of an agricultural combine, the slat comprising:
an elongated slat member extending in a lengthwise direction between a first end and a second end and in a widthwise direction between a front side and a rear side, the elongated slat member comprising:
a connector web extending in the lengthwise direction between the first and second ends and in the widthwise direction between the front and rear sides, the connector web defining an outer surface and an inner surface;
a front wall extending outwardly relative to the connector web along the front side of the elongated slat member, the front wall defining a front face of the elongated slat member, the front face extending in a heightwise direction of the elongated slat member between an inner end and an outer end, the front wall defining a plurality of notches at the outer end of the front face; and
a rear wall extending outwardly relative to the connector web along the rear side of the elongated slat member;
wherein at least a portion of the front face of the elongated slat member includes a plurality of surface features, wherein the plurality of surface features are defined on the front face of the elongate slat member forming at least first and second laterally extending rows of the plurality of surface features at a location separate from the notches between the outer and inner ends of the front face.

13. The slat of claim 12, wherein the plurality of surface features comprises a plurality of recessed channels.

14. The slat of claim 12, wherein the plurality of surface features comprises a plurality of raised ribs.

15. The slat of claim 12, wherein the plurality of surface features comprises a plurality of dimples.

16. The slat of claim 12, wherein the plurality of surface features form a pattern across at least a portion of the front face, the pattern corresponding to one of a serrated pattern, a wavy pattern, a rippled pattern, or a "X-shaped" pattern.

17. The slat of claim 12, wherein the plurality of surface features comprises a textured coating disposed on the front face of the elongated slat member.

* * * * *